(12) United States Patent
Araki et al.

(10) Patent No.: US 12,117,698 B2
(45) Date of Patent: Oct. 15, 2024

(54) INTELLIGENT REFLECTING SURFACE AND INTELLIGENT REFLECTING DEVICE

(71) Applicant: Japan Display Inc., Tokyo (JP)

(72) Inventors: Shigesumi Araki, Tokyo (JP); Mitsutaka Okita, Tokyo (JP); Daiichi Suzuki, Tokyo (JP); Shinichiro Oka, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/509,747

(22) Filed: Nov. 15, 2023

(65) Prior Publication Data

US 2024/0085746 A1  Mar. 14, 2024

Related U.S. Application Data

(63) Continuation of application No. PCT/JP2022/020081, filed on May 12, 2022.

(30) Foreign Application Priority Data

May 17, 2021  (JP) ................................ 2021-083447

(51) Int. Cl.
*G02F 1/1343* (2006.01)
*G02F 1/1335* (2006.01)
(Continued)

(52) U.S. Cl.
CPC .... *G02F 1/134381* (2021.01); *G02F 1/13439* (2013.01); *G02F 1/1368* (2013.01); *G02F 2203/02* (2013.01)

(58) Field of Classification Search
CPC ................. G02F 1/1313; G02F 1/1335; G02F 1/133553; G02F 1/133557; G02F 1/1343;
(Continued)

(56) References Cited

U.S. PATENT DOCUMENTS

| | | | |
|---|---|---|---|
| 2005/0157227 A1* | 7/2005 | Hashimoto | ....... G02F 1/133553 |
| | | | 349/113 |
| 2018/0083364 A1 | 3/2018 | Foo | |
| 2018/0138594 A1 | 5/2018 | Orui et al. | |

FOREIGN PATENT DOCUMENTS

| | | |
|---|---|---|
| JP | H11103201 A | 4/1999 |
| JP | 2005003990 A | 1/2005 |

(Continued)

OTHER PUBLICATIONS

Patent Translate JP 2005003990 (Jan. 6, 2005).*
(Continued)

*Primary Examiner* — Thoi V Duong
(74) *Attorney, Agent, or Firm* — Maier & Maier, PLLC

(57) ABSTRACT

An intelligent reflecting surface includes a substrate having a first surface including a first side and a reflective region including a plurality of reflective elements arranged on the first surface, a plurality of reflective elements separated from each other by a first interval and arranged at a first pitch in a first direction and a second direction orthogonal to the first direction. Twice a distance from the first side to a first reflective element adjacent to the first side among the plurality of reflective elements is a sum of an integral multiple of the first pitch and the first interval.

19 Claims, 7 Drawing Sheets

(51) Int. Cl.
*G02F 1/1362* (2006.01)
*G02F 1/1368* (2006.01)

(58) Field of Classification Search
CPC ........... G02F 1/134381; G02F 1/13439; G02F 1/1345; G02F 1/13452; G02F 1/1362; G02F 1/136227; G02F 1/136286; G02F 1/1368; G02F 2203/02; H01Q 3/44; H01Q 15/14
See application file for complete search history.

(56) References Cited

FOREIGN PATENT DOCUMENTS

| | | |
|---|---|---|
| JP | 2019530387 A | 10/2019 |
| WO | 2017065255 A1 | 4/2017 |

OTHER PUBLICATIONS

International Search Report, issued on Jul. 19, 2022, in corresponding International Patent Application No. PCT/JP2022/020081, 5 pages.

* cited by examiner

INTELLIGENT REFLECTING SURFACE AND INTELLIGENT REFLECTING DEVICE

CROSS REFERENCE TO RELATED APPLICATIONS

This application is a Continuation of International Patent Application No. PCT/JP2022/020081, filed on May 12, 2022, which claims the benefit of priority to Japanese Patent Application No. 2021-083447, filed on May 17, 2021, the entire contents of which are incorporated herein by reference.

FIELD

An embodiment of the present invention relates to an intelligent reflecting surface using a liquid crystal material. An embodiment of the present invention relates to an intelligent reflecting device including the intelligent reflecting surface using a liquid crystal material.

BACKGROUND

A phased array antenna device has characteristics that the radiation directivity of the antenna can be controlled while the direction of the antenna is fixed in one direction by controlling the amplitudes and phases of the respective high-frequency signals when a high-frequency signal is applied to part or all of a plurality of antenna elements. The phased array antenna device uses a phase shifter to control the phase of the high frequency signal applied to the antenna element.

Various methods have been adopted as the method of the phase shifter, such as a method of physically changing a length of a transmission line to change the phase of the high-frequency signal, a method of changing the impedance in the middle of the transmission line to reflect the high-frequency phase, and a method of generating a signal having a desired phase by controlling and synthesizing the gains of an amplifier for amplifying two signals having different phases. In addition to these, as an example of a phase shifter, a method using characteristics unique to a liquid crystal material in which a dielectric constant is changed by an applied voltage is disclosed (see Japanese laid-open patent publication No. 11-103201).

On the other hand, a metamaterial reflecting surface which uses the dielectric anisotropy of the liquid crystal to change the phase of reflected wave of a radio wave incident on the reflective element. By applying different voltages to patch electrodes of the adjacent reflective elements, the metamaterial reflective surface varies the amount of phase change between each, and can behave in such a manner that the reflection direction of the radio wave is apparently changed. For example, Japanese laid-open patent publication No. 2019-530387 discloses a meta surface to control the resonant frequency of corresponding reflective elements by applying a voltage to a reflective element including a liquid crystal to change the orientation of molecules of the liquid crystal in the reflective element to adjust the reflection phase.

SUMMARY

An intelligent reflecting surface according to an embodiment of the present invention includes a substrate having a first surface including a first side, and a reflective region including a plurality of reflective elements arranged on the first surface, a plurality of reflective elements separated from each other by a first interval and arranged at a first pitch in a first direction and a second direction orthogonal to the first direction. Twice a distance from the first side to a first reflective element adjacent to the first side among the plurality of reflective elements is a sum of an integral multiple of the first pitch and the first interval.

An intelligent reflecting surface according to an embodiment of the present invention includes a substrate having a first surface including a first side and a second side opposed to the first side, and a reflective region including a plurality of reflective elements arranged on the first surface, a plurality of reflective elements separated from each other by a first interval and arranged at a first pitch in a first direction and a second direction orthogonal to the first direction. A sum of a distance from the first side to a first reflective element adjacent to the first side among the plurality of reflective elements and a distance from the second side to a second reflective element adjacent to the second side among the plurality of reflective elements is a sum of an integral multiple of the first pitch and the first interval.

An intelligent reflecting device according to an embodiment of the present invention includes a first intelligent reflecting surface and a second intelligent reflecting surface adjacent to the first intelligent reflecting surface. Each of the first intelligent reflecting surface and the second intelligent reflecting surface includes a substrate having a first surface including a first side, and a reflective region including a plurality of reflective elements arranged on the first surface, a plurality of reflective elements separated from each other by a first interval and arranged at a first pitch in a first direction and a second direction orthogonal to the first direction. A distance in the second direction between a first reflective element arranged adjacent to the first side among the plurality of reflective elements of the first intelligent reflecting surface and a second reflective element arranged adjacent to the first side among the plurality of reflective elements of the second intelligent reflecting surface is a sum of an integral multiple of the first pitch and the first interval.

DESCRIPTION OF EMBODIMENTS

Figure 1A:
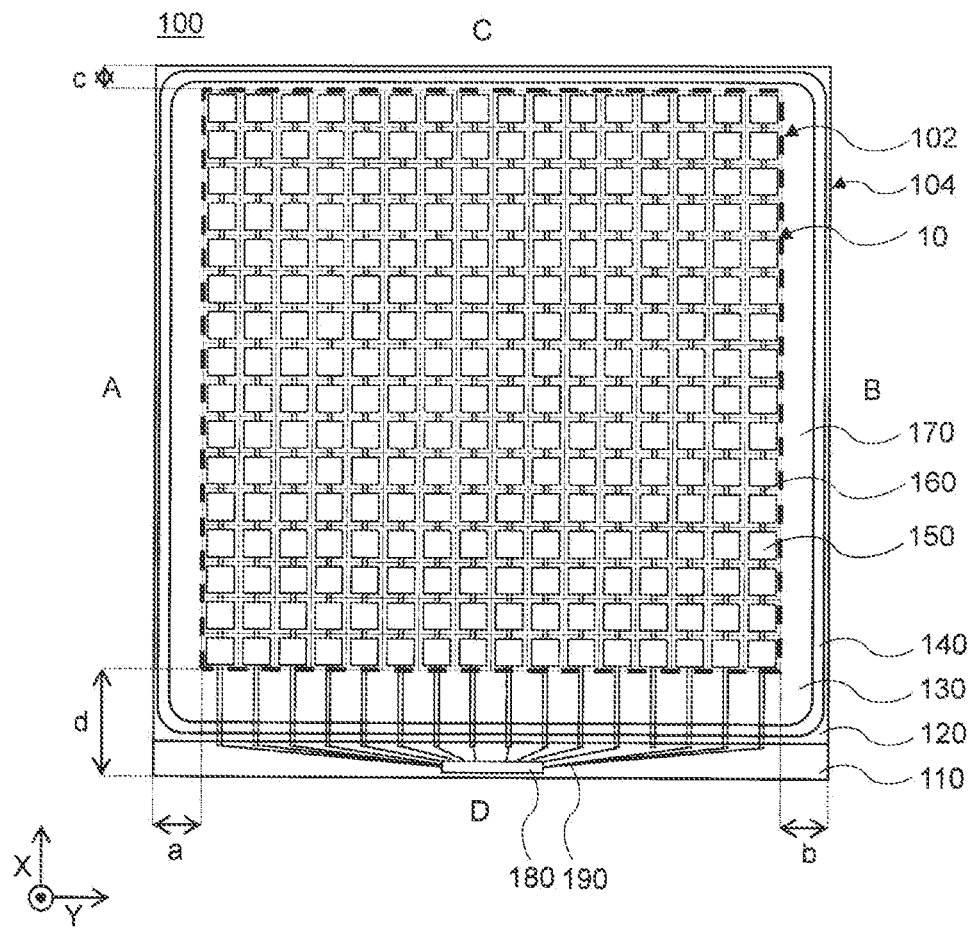
FIG. 1A is a plan view showing a configuration of an intelligent reflecting surface according to an embodiment of the present invention.

Hereinafter, embodiments of the present invention will be described with reference to the drawings and the like. However, the present invention can be implemented in many different aspects, and should not be construed as being limited to the description of the embodiments exemplified below. In order to clarify the description, the width, thickness, shape, and the like of each part may be schematically represented in comparison with the actual embodiments, but the drawings are merely examples and do not limit the interpretation of the present invention. Further, in the present specification and the drawings, elements similar to those described above with respect to the above-described figures are denoted by the same reference signs (or reference signs denoted by a, b, and the like) and detailed description thereof may be omitted as appropriate. Furthermore, the letters "first" and "second" with respect to each element are convenient signs used to distinguish each element, and do not have any further meaning unless otherwise specified.

In this specification, the case where a member or region is "above (or below)" another member or region, includes, without limitation, the case where it is directly above (or below) the other member or region, but also the case where it is above (or below) the other member or region, that is, the case where another component is included between at above (or below) the other member or region. In the following description, unless otherwise specified, in a cross-sectional view, the upper side is referred to as "upper" or "above" with respect to the front position of the drawing, the surface viewed from "upper" or "above" is referred to as "upper surface" or "upper surface side", and the opposite side is referred to as "lower", "below", "lower surface" or "lower surface side".

First Embodiment

[Configuration of Intelligent Reflecting Surface]

Figure 1B:
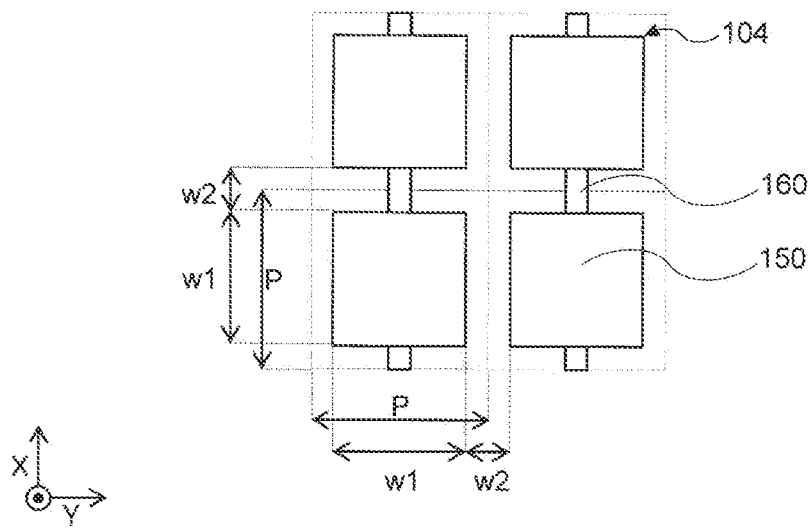
FIG. 1B is an enlarged plan view showing a plurality of reflective elements of an intelligent reflecting surface according to an embodiment of the present invention.

FIG. 1A is a plan view showing an intelligent reflecting surface according to an embodiment of the present invention. FIG. 1B is an enlarged plan view of a plurality of reflective elements of an intelligent reflecting surface according to an embodiment of the present invention. An intelligent reflecting surface 100 includes a reflective region 102 that reflects a radio wave and a peripheral region 104 that surrounds the reflective region 102 on a first surface of an array substrate 110. In the reflective region 102, a plurality of reflective elements 10 is spaced apart at the same interval w2 as the adjacent reflective elements 10, and is arranged in an array at the same period (pitch) P in a first direction (direction X) along a first side A of the array substrate 110 and in a second direction (direction Y) perpendicular to the first direction.

Each of the plurality of reflective elements 10 includes a first electrode 150, a liquid crystal layer 130, and a second electrode 170. A plurality of first electrodes 150 is formed on the first surface of the array substrate 110. The second electrode 170 is formed on a first surface of a counter substrate 120. The first electrode 150 and the second electrode 170 are arranged to face each other in a third direction (Z direction) perpendicular to the first direction (direction X) and the second direction (direction Y). The liquid crystal layer 130 is arranged between the first electrode 150 and the second electrode 170. The liquid crystal layer 130 and the second electrode 170 may be arranged in common with the plurality of reflective elements 10. The first electrode 150 is arranged one by one for the plurality of reflective elements 10 and defines one unit of the reflective element 10.

In the present embodiment, the plurality of first electrodes 150 is shown as squares having the same width w1 in the first direction (direction X) and the second direction (direction Y), respectively. However, the present invention is not limited to this, and the plurality of first electrodes 150 may be symmetrical in the first direction (direction X) and the second direction (direction Y), and may be, for example, polygonal or circular.

The plurality of first electrodes 150 is spaced apart from each other by the same interval w2 in the first direction (X-axis direction). The plurality of first electrodes 150 is spaced apart from each other by the same interval w2 in the second direction (Y-axis direction) perpendicular to the first direction. The interval w2 of the plurality of first electrodes 150 aligned in the first direction (X-axis direction) and the interval w2 of the plurality of first electrodes 150 aligned in the second direction (Y-axis direction) are substantially the same.

The plurality of first electrodes 150 is arranged in an array at the same period (pitch) P in the first direction (X-axis direction). The plurality of first electrodes 150 is arranged in an array at the same period (pitch) P in the second direction (Y-axis direction) perpendicular to the first direction. The period (pitch) P of the plurality of first electrodes 150 aligned in the first direction (X-axis direction) and the period (pitch) P of the plurality of first electrodes 150 aligned in the second direction (Y-axis direction) are substantially the same. The period (pitch) P of the first electrode 150 is a sum of the width w1 of the first electrode 150 and the interval w2 of the first electrode 150.

The period (pitch) P in which the reflective elements 10 is arranged is preferably in a range of ⅓ or more to ½ or less of a wavelength of the radio wave so as to maximize a reflected power. For example, assuming the 28 GHz band used in Japanese 5G, the period (pitch) P in which the reflective elements 10 is arranged is preferably 3 mm or more and 6 mm or less because the wavelength is 10.7 mm. In view of the width of the adjacent interval w2, the width w1 of the first electrode 150 is preferably 2 mm or more and 5 mm or less.

In the reflective region 102, the plurality of first electrodes 150 arranged along the first direction (X-axis direction) is electrically connected by a thin line pattern 160. In the peripheral region 104, the thin line pattern 160 is electrically connected to a drive circuit 180 via a wiring 190. The counter substrate 120 exposes the wiring 190 and the drive circuit 180 on the array substrate 110. A flexible printed substrate is further connected to the drive circuit 180 via a terminal (not shown).

The intelligent reflecting surface 100 has a reflection axis parallel to the first direction. In the intelligent reflecting surface 100, the same signal is input to the plurality of first electrodes 150 electrically connected by the thin line pattern 160. Therefore, the intelligent reflecting surface 100 can control a reflection angle in a rotation direction with the reflection axis parallel to the first direction as an axis.

In the reflective region 102, the liquid crystal layer 130 is filled between the plurality of first electrodes 150 and the second electrode 170. In the peripheral region 104, the liquid crystal layer 130 is enclosed and sealed by a seal 140.

The first surface of the array substrate 110 includes a first side A extending in the first direction (direction X), a second side B opposed to the first side A, a third side C connecting the first side A and the second side B, and a fourth side D opposed to the third side C. In the present embodiment, a sum of a distance a from the first side A to a reflective element 10 adjacent to the first side A among the plurality of reflective elements 10 and a distance b from the second side B to a reflective element 10 adjacent to the second side B among the plurality of reflective elements 10 is a sum of the integral multiple of the period (pitch) P in which the plurality of reflective elements 10 is arranged and the interval w2 of the adjacent reflective elements 10. In other words, a sum of a width a of the peripheral region arranged on the first side A and a width b of the peripheral region arranged on the second side B satisfies nW1+(n+1) W2 (n is an integer of 0 or more) when the width of the reflective element 10 is W1 and the interval of the reflective elements 10 is W2. In this case, the width a of the peripheral region indicates a distance between the first side A and the reflective region 102 in the second direction (Y-axis direction), and the width b of the peripheral region indicates a distance between the second side B and the reflective region 102 in the second direction (Y-axis direction).

In the present embodiment, twice a distance c from the third side C to a reflective element 10 adjacent to the third side C among the plurality of reflective elements 10 is the sum of the integral multiple of the period (pitch) P in which the plurality of reflective elements 10 is arranged and the interval w2 of the adjacent reflective elements 10. In other words, twice the width c of the peripheral region arranged on the third side C satisfies mW1+(m+1) W2 (m is an integer of 0 or more) when the width of the reflective element 10 is W1 and the interval of the reflective elements 10 is W2. In this case, the width c of the peripheral region indicates a distance between the third side C and the reflective region 102 in the first direction (X-axis direction).

In the present embodiment, twice a distance d from the fourth side D to a reflective element 10 adjacent to the fourth side D among the plurality of reflective elements 10 is the sum of the integral multiple of the period (pitch) P in which the plurality of reflective elements 10 is arranged and the interval w2 of the adjacent reflective elements 10. In other words, twice the width d of the peripheral region arranged on the fourth side D satisfies lW1+(l+1) W2 (l is an integer of 0 or more) when the width of the reflective element 10 is W1 and the interval of the reflective elements 10 is W2. In this case, the width d of the peripheral region indicates a distance between the fourth side D and the reflective region 102 in the first direction (X-axis direction). The widths a, b, c, and d of the peripheral region may be different or the same.

Since the intelligent reflecting surface according to the present embodiment has the above-described configuration, the pitch of the reflective elements can be made constant in a plane when a plurality of intelligent reflecting surfaces is combined.

[Configuration of Intelligent Reflecting Device]

Figure 2A:
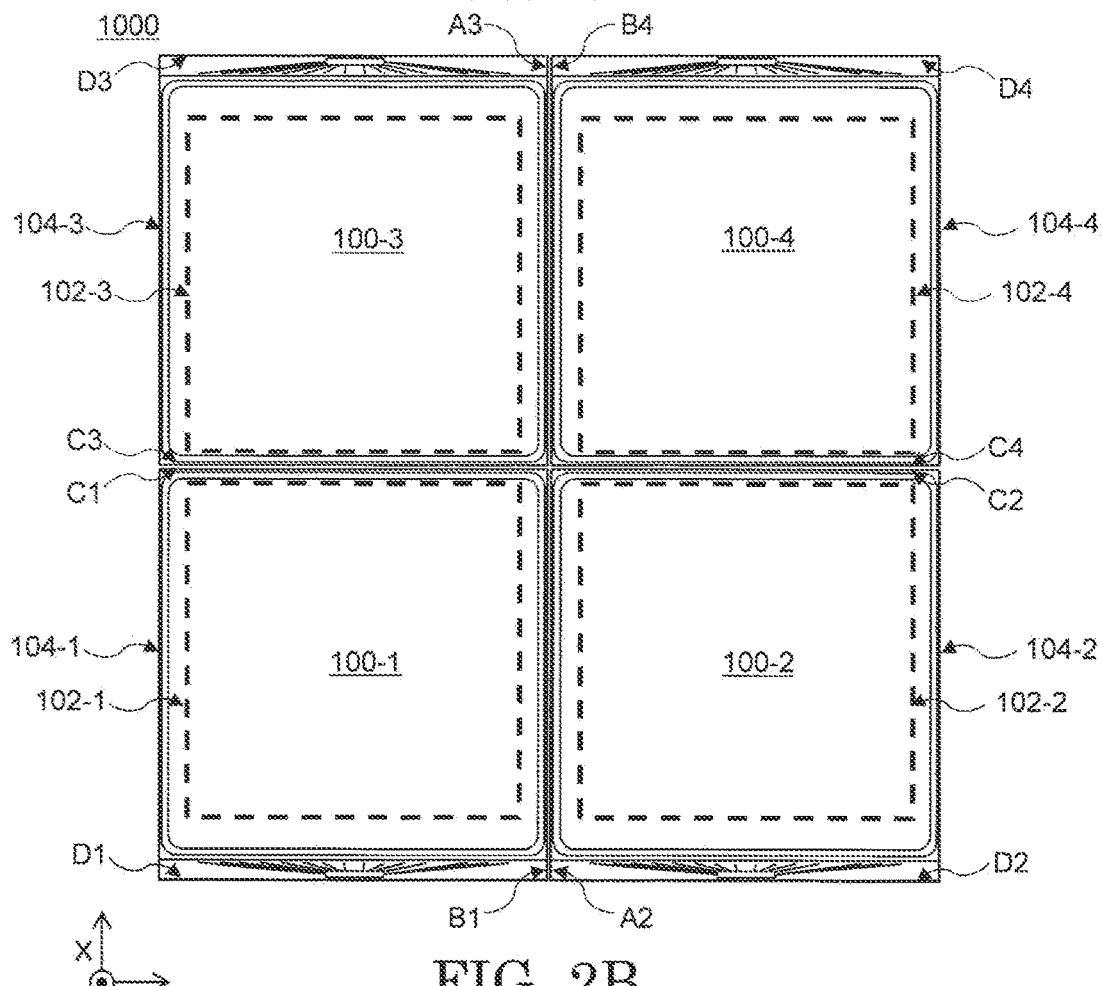
FIG. 2A is a plan view showing a configuration of an intelligent reflecting device according to an embodiment of the present invention.
Figure 2B:
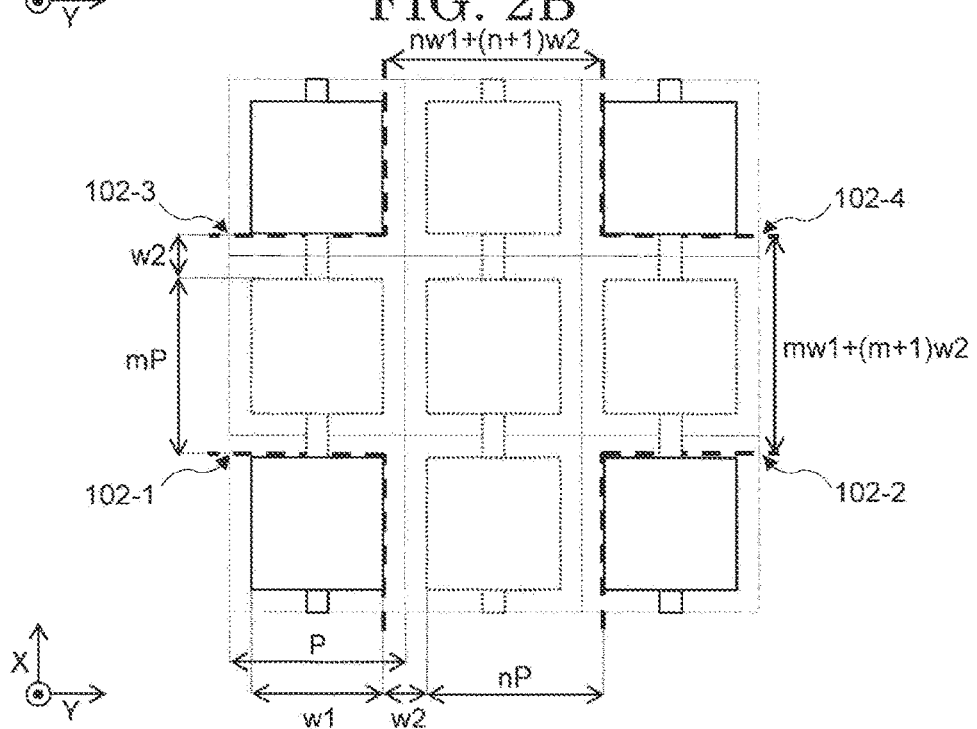
FIG. 2B is an enlarged plan view showing a connection part of each intelligent reflecting surface of an intelligent reflecting device according to an embodiment of the present invention.

FIG. 2A is a plan view showing an intelligent reflecting device according to an embodiment of the present invention. FIG. 2B is an enlarged plan view showing a connection part of each intelligent reflecting surface of an intelligent reflecting device according to an embodiment of the present invention. In FIG. 2B, the reflective elements 10 shown in dotted lines are not actually arranged, but are shown here as virtual reflective elements in order to make it easier to understand the combined pitch. An intelligent reflecting device 1000 includes a n intelligent reflecting surface 100-1, an intelligent reflecting surface 100-2, an intelligent reflecting surface 100-3, and an intelligent reflecting surface 100-4 (in the case where the intelligent reflecting surfaces 100-1, 100-2, 100-3, and 100-4 are not distinguished, they are referred to as the intelligent reflecting surface 100). Each of the intelligent reflecting surfaces 100-1, 100-2, 100-3, and 100-4 includes reflective regions 102-1, 102-2, 102-3, and 102-4 which reflect a radio wave and the peripheral regions 104-1, 104-2, 104-3, and 104-4 surrounding the reflective regions 102-1, 102-2, 102-3, and 102-4 (in the case where the reflective regions 102-1, 102-2, 102-3, and 102-4 are not distinguished, they are referred to as the reflective region 102 and in the case where the peripheral regions 104-1, 104-2, 104-3, and 104-4 are not distinguished, they are referred to as the peripheral region 104). In the reflective region 102, the plurality of reflective elements 10 is spaced apart at the same interval w2 as the adjacent reflective elements 10, and is arranged in an array at the same period (pitch) P in the first direction (direction X) along the first side A of the array substrate 110 and in the second direction (direction Y) perpendicular to the first direction.

The first surface of the array substrate 110 included in the intelligent reflecting surface 100-1 includes a first side A1 extending in the first direction (direction X), a second side B1 opposed to the first side A1, a third side C1 connecting the first side A1 and the second side B1, and a fourth side D1 opposed to the third side C1. The first surface of the array substrate 110 included in the intelligent reflecting surface 100-2 includes a first side A2 extending in the first direction (direction X), a second side B2 opposed to the first side A2, a third side C2 connecting the first side A2 and the second side B2, and a fourth side D2 opposed to the third side C2. The first surface of the array substrate 110 included in the intelligent reflecting surface 100-3 includes a first side A3 extending in the first direction (direction X), a second side B3 opposed to the first side A3, a third side C3 connecting the first side A3 and the second side B3, and a fourth side D3 opposed to the third side C3. The first surface of the array substrate 110 included in the intelligent reflecting surface 100-4 includes a first side A4 extending in the first direction (direction X), a second side B4 opposed to the first side A4, a third side C4 connecting the first side A4 and the second side B4, and a fourth side D4 opposed to the third side C4.

In the present embodiment, the second side B1 of the intelligent reflecting surface 100-1 and the first side A2 of the intelligent reflecting surface 100-2 are arranged adjacently. A distance in the second direction (Y-axis direction) between the reflective element 10 arranged adjacent to the second side B1 of the intelligent reflecting surface 100-1 and the reflective element 10 arranged adjacent to the first side A2 of the intelligent reflecting surface 100-2 is the sum of the integral multiple of the period (pitch) P in which the plurality of reflective elements 10 is arranged and the interval w2 of the adjacent reflective elements 10. In other words, the distance between the reflective region 102-1 of the intelligent reflecting surface 100-1 and the reflective region 102-2 of the intelligent reflecting surface 100-2 satisfies nW1+(n+1) W2 (n is an integer of 0 or more) when the width of the reflective element 10 is W1 and the interval of the reflective element 10 is W2. In this case, the distance between the reflective region 102-1 and the reflective region 102-2 indicates the sum of the distance between the second side B1 and the reflective region 102-1 in the second direction (Y-axis direction), the distance between the second side B1 and the first side A2 in the second direction (Y-axis direction), and the distance between the first side A2 and the reflective region 102-2 in the second direction (Y-axis direction).

In the present embodiment, the third side C1 of the intelligent reflecting surface 100-1 and the third side C3 of the intelligent reflecting surface 100-3 are arranged adjacently. The distance in the first direction (X-axis direction) between the reflective element 10 arranged adjacent to the third side C1 of the intelligent reflecting surface 100-1 and the reflective element 10 arranged adjacent to the third side C3 of the intelligent reflecting surface 100-3 is the sum of the integral multiple of the period (pitch) P in which the plurality of reflective elements 10 is arranged and the interval w2 of the adjacent reflective elements 10. In other words, the distance between the reflective region 102-1 of the intelligent reflecting surface 100-1 and the reflective region 102-3 of the intelligent reflecting surface 100-3 satisfies mW1+(m+1) W2 (m is an integer of 0 or more) when the width of the reflective element 10 is W1 and the interval of the reflective elements 10 is W2. In this case, the distance between the reflective region 102-1 and the reflective region 102-3 indicates the sum of the distance between the third side C1 and the reflective region 102-1 in the first direction (X-axis direction), the distance between the third side C1 and the third side C3 in the first direction (X-axis direction), and the distance between the third side C3 and the reflective region 102-3 in the first direction (X-axis direction).

In the present embodiment, the first side A3 of the intelligent reflecting surface 100-3 and the second side B4 of the intelligent reflecting surface 100-4 are arranged adjacently. The distance in the second direction (Y-axis direction) between the reflective element 10 arranged adjacent to the first side A3 of the intelligent reflecting surface 100-3 and the reflective element 10 arranged adjacent to the second side B4 of the intelligent reflecting surface 100-4 is the sum of the integral multiple of the period (pitch) P in which the plurality of reflective elements 10 is arranged and the interval w2 of the reflective element 10 adjacent to each other. In other words, the distance between the reflective region 102-3 of the intelligent reflecting surface 100-3 and the reflective region 102-4 of the intelligent reflecting surface 100-4 satisfies nW1+(n+1) W2 (n is an integer of 0 or more) when the width of the reflective element 10 is W1 and the interval of the reflective element 10 is W2. In this case, the distance between the reflective region 102-3 and the reflective region 102-4 indicates the sum of the distance between the first side A3 and the reflective region 102-3 in the second direction (Y-axis direction), the distance between the first side A3 and the second side B4 in the second direction (Y-axis direction), and the distance between the second side B4 and the reflective region 102-4 in the second direction (Y-axis direction).

In the present embodiment, the third side C2 of the intelligent reflecting surface 100-2 and the third side C4 of the intelligent reflecting surface 100-4 are arranged adjacently. The distance in the first direction (X-axis direction) between the reflective element 10 arranged adjacent to the third side C2 of the intelligent reflecting surface 100-2 and the reflective element 10 arranged adjacent to the third side C4 of the intelligent reflecting surface 100-4 is the sum of the integral multiple of the period (pitch) P in which the plurality of reflective elements 10 is arranged and the interval w2 of the reflective element 10 adjacent to each other. In other words, the distance between the reflective region 102-2 of the intelligent reflecting surface 100-2 and the reflective region 102-4 of the intelligent reflecting surface 100-4 satisfies mW1+(m+1) W2 (m is an integer of 0 or more) when the width of the reflective element 10 is W1 and the interval of the reflective element 10 is W2. In this case, the distance between the reflective region 102-2 and the reflective region 102-4 indicates the sum of the distance between the third side C2 and the reflective region 102-2 in the first direction (X-axis direction), the distance between the third side C2 and the third side C4 in the first direction (X-axis direction), and the distance between the third side C4 and the reflective region 102-4 in the first direction (X-axis direction).

In FIG. 2A, a configuration in which four intelligent reflecting surfaces 100 are combined is shown. However, the present invention is not limited to this, and the above-described configuration in which the four intelligent reflecting surfaces 100 are combined may be further combined in the vertical and horizontal directions as one unit.

In this case, the fourth side D2 of the intelligent reflecting surface 100-2 and the fourth side D4 of the intelligent reflecting surface 100-4 may be arranged adjacently. The distance in the first direction (X-axis direction) between the reflective element 10 arranged adjacent to the fourth side D2 of the intelligent reflecting surface 100-2 and the reflective element 10 arranged adjacent to the fourth side D4 of the intelligent reflecting surface 100-4 is the sum of the integral multiple of the period (pitch) P in which the plurality of reflective elements 10 is arranged and the interval w2 of the reflective element 10 adjacent to each other. In other words, the distance between the reflective region 102-2 of the intelligent reflecting surface 100-2 and the reflective region 102-4 of the intelligent reflecting surface 100-4 satisfies lW1+(l+1) W2 (l is an integer of 0 or more) when the width of the reflective element 10 is W1 and the interval of the reflective element 10 is W2. In this case, the distance between the reflective region 102-2 and the reflective region 102-4 indicates the sum of the distance between the fourth side D2 and the reflective region 102-2 in the first direction (X-axis direction), the distance between the fourth side D2 and the fourth side D4 in the first direction (X-axis direction), and the distance between the fourth side D4 and the reflective region 102-4 in the first direction (X-axis direction).

Further, the fourth side D1 of the intelligent reflecting surface 100-1 and the fourth side D3 of the intelligent reflecting surface 100-3 may be arranged adjacently, and may have the same relationship as the fourth side D2 of the intelligent reflecting surface 100-2 and the fourth side D4 of the intelligent reflecting surface 100-4.

In the intelligent reflecting device according to the present embodiment, the pitch of the reflective element can be made constant in a plane in which a plurality of intelligent reflecting surfaces is combined. With the above-described configuration, the intelligent reflecting device according to the present embodiment can easily adjust the position at the time of installation, and can simplify the direction control of the radio wave.

Second Embodiment

[Configuration of Intelligent Reflecting Surface]

A configuration of the intelligent reflecting surface according to the present embodiment is the same as that of the intelligent reflecting surface according to the first embodiment except for the widths c and d of the peripheral region. Descriptions that are the same as those of the first embodiment are omitted, and portions different from those of the intelligent reflecting surface according to the first embodiment will be described.

In the present embodiment, the sum of the distance a from the first side A to a reflective element 10 adjacent to the first side A among the plurality of reflective elements 10 and the distance b from the second side B to a reflective element 10 adjacent to the second side B among the plurality of reflective elements 10 is the sum of the integral multiple of the period (pitch) P in which the plurality of reflective elements 10 is arranged and the interval w2 of the adjacent reflective elements 10. In other words, the sum of the width a of the peripheral region arranged on the first side A and the width b of the peripheral region arranged on the second side B satisfies nW1+(n+1) W2 (n is an integer of 0 or more) when the width of the reflective element 10 is W1 and the interval of the reflective element 10 is W2. In this case, the width a of the peripheral region indicates the distance between the first side A and the reflective region 102 in the second direction (Y-axis direction), and the width b of the peripheral region indicates the distance between the second side B and the reflective region 102 in the second direction (Y-axis direction).

In the present embodiment, the sum of the distance c from the third side C to a reflective element 10 adjacent to the third side C among the plurality of reflective elements 10 and the distance d from the fourth side D to a reflective element 10 adjacent to the fourth side D among the plurality of reflective elements 10 is the sum of the integral multiple of the period (pitch) P in which the plurality of reflective elements 10 is arranged and the interval w2 of the adjacent reflective elements 10. In other words, the sum of the width c of the peripheral region arranged on the third side C and the width d of the peripheral region arranged on the fourth side D satisfies oW1+(o+1) W2 (o is an integer of 0 or more) when the width of the reflective element 10 is W1 and the interval of the reflective element 10 is W2. In this case, the width c of the peripheral region indicates the distance between the third side C and the reflective region 102 in the first direction (X-axis direction), and the width d of the peripheral region indicates the distance between the fourth side D and the reflective region 102 in the first direction (X-axis direction).

Since the intelligent reflecting surface according to the present embodiment has the above-described configuration, the pitch of the reflective elements can be made constant in a plane when a plurality of intelligent reflecting surfaces is combined.

[Configuration of Intelligent Reflecting Device]

A configuration of an intelligent reflecting device 2000 according to the present embodiment is the same as that of the intelligent reflecting device 1000 according to the first embodiment except for the arrangement direction of each intelligent reflecting surface and the distance between each reflective region. Descriptions that are the same as those of the first embodiment are omitted, and portions different from those of the intelligent reflecting device 1000 according to the first embodiment will be described.

Figure 3A:
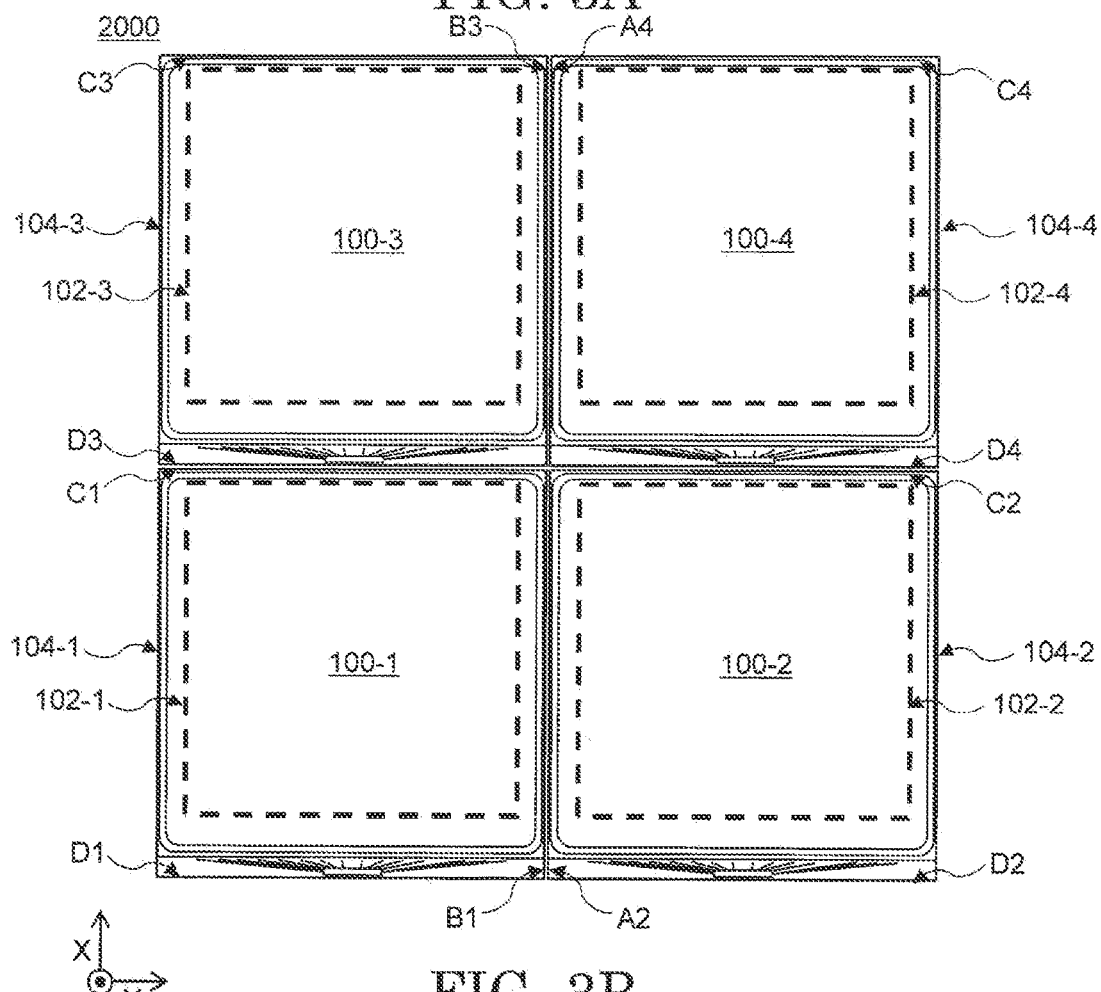
FIG. 3A is a plan view showing a configuration of an intelligent reflecting device according to an embodiment of the present invention.
Figure 3B:
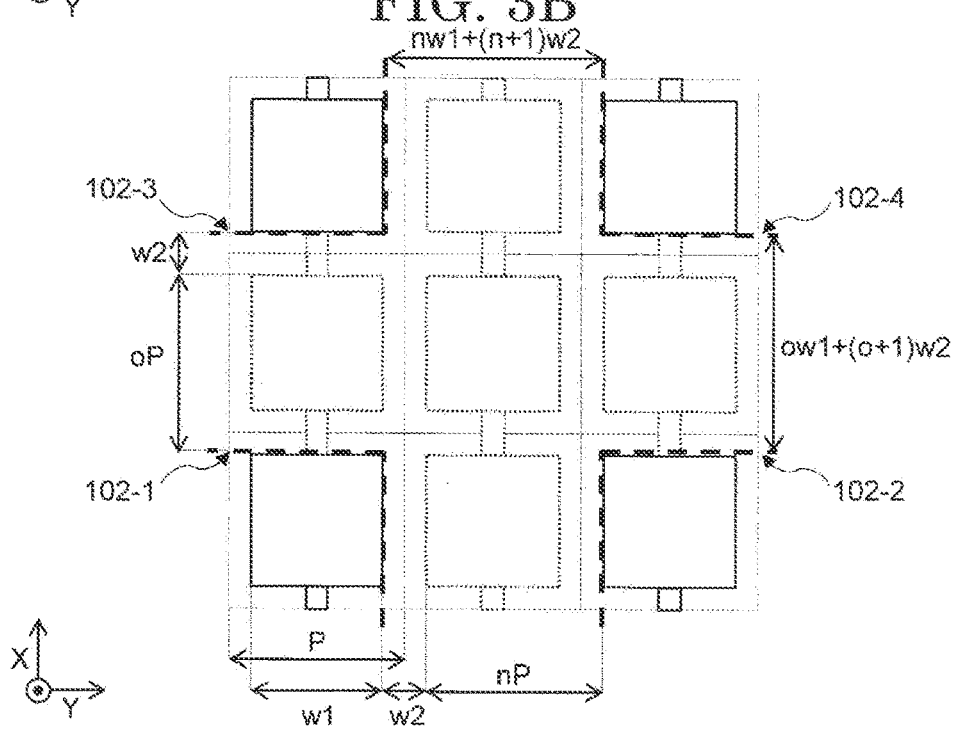
FIG. 3B is an enlarged plan view showing a connection part of each intelligent reflecting surface of an intelligent reflecting device according to an embodiment of the present invention.

FIG. 3A is a plan view showing an intelligent reflecting device according to an embodiment of the present invention. FIG. 3B is an enlarged plan view showing a connection part of an intelligent reflecting surface of an intelligent reflecting device according to an embodiment of the present invention. In FIG. 3B, the reflective elements 10 shown in dotted lines are not actually arranged, but are shown here as virtual reflective elements in order to make it easier to understand the combined pitch.

In the present embodiment, the second side B1 of the intelligent reflecting surface 100-1 and the first side A2 of the intelligent reflecting surface 100-2 are arranged adjacently. The distance in the second direction (Y-axis direction) between the reflective element 10 arranged adjacent to the second side B1 of the intelligent reflecting surface 100-1 and the reflective element 10 arranged adjacent to the first side A2 of the intelligent reflecting surface 100-2 is the sum of the integral multiple of the period (pitch) P in which the plurality of reflective elements 10 is arranged and the interval w2 of the adjacent reflective elements 10. In other words, the distance between the reflective region 102-1 of the intelligent reflecting surface 100-1 and the reflective region 102-2 of the intelligent reflecting surface 100-2 satisfies nW1+(n+1) W2 (n is an integer of 0 or more) when the width of the reflective element 10 is W1 and the interval of the reflective element 10 is W2. In this case, the distance between the reflective region 102-1 and the reflective region 102-2 indicates the sum of the distance between the second side B1 and the reflective region 102-1 in the second direction (Y-axis direction), the distance between the second side B1 and the first side A2 in the second direction (Y-axis direction), and the distance between the first side A2 and the reflective region 102-2 in the second direction (Y-axis direction).

In the present embodiment, the third side C1 of the intelligent reflecting surface 100-1 and the fourth side D3 of the intelligent reflecting surface 100-3 are arranged adjacently. The distance in the first direction (X-axis direction) between the reflective element 10 arranged adjacent to the third side C1 of the intelligent reflecting surface 100-1 and the reflective element 10 arranged adjacent to the fourth side D3 of the intelligent reflecting surface 100-3 is the sum of the integral multiple of the period (pitch) P in which the plurality of reflective elements 10 is arranged and the interval w2 of the adjacent reflective elements 10. In other words, the distance between the reflective region 102-1 of the intelligent reflecting surface 100-1 and the reflective region 102-3 of the intelligent reflecting surface 100-3 satisfies oW1+(o+1) W2 (o is an integer of 0 or more) when the width of the reflective element 10 is W1 and the interval of the reflective element 10 is W2. In this case, the distance between the reflective region 102-1 and the reflective region 102-3 indicates the sum of the distance between the third side C1 and the reflective region 102-1 in the first direction (X-axis direction), the distance between the third side C1 and the fourth side D3 in the first direction (X-axis direction), and the distance between the fourth side D3 and the reflective region 102-3 in the first direction (X-axis direction).

In the present embodiment, the second side B3 of the intelligent reflecting surface 100-3 and the first side A4 of the intelligent reflecting surface 100-4 are arranged adjacently. The distance in the second direction (Y-axis direction) between the reflective element 10 arranged adjacent to the second side B3 of the intelligent reflecting surface 100-3 and the reflective element 10 arranged adjacent to the first side A4 of the intelligent reflecting surface 100-4 is the sum of the integral multiple of the period (pitch) P in which the plurality of reflective elements 10 is arranged and the interval w2 of the adjacent reflective elements 10. In other words, the distance between the reflective region 102-3 of the intelligent reflecting surface 100-3 and the reflective region 102-4 of the intelligent reflecting surface 100-4 satisfies nW1+(n+1) W2 (n is an integer of 0 or more) when the width of the reflective element 10 is W1 and the interval of the reflective element 10 is W2. In this case, the distance between the reflective region 102-3 and the reflective region 102-4 indicates the sum of the distance between the second side B3 and the reflective region 102-3 in the second direction (Y-axis direction), the distance between the second side B3 and the first side A4 in the second direction (Y-axis direction), and the distance between the first side A4 and the reflective region 102-4 in the second direction (Y-axis direction).

In the present embodiment, the third side C2 of the intelligent reflecting surface 100-2 and the fourth side D4 of the intelligent reflecting surface 100-4 are arranged adjacently. The distance in the first direction (X-axis direction) between the reflective element 10 arranged adjacent to the third side C2 of the intelligent reflecting surface 100-2 and the reflective element 10 arranged adjacent to the fourth side D4 of the intelligent reflecting surface 100-4 is the sum of the integral multiple of the period (pitch) P in which the plurality of reflective elements 10 is arranged and the interval w2 of the adjacent reflective elements 10. In other words, the distance between the reflective region 102-2 of the intelligent reflecting surface 100-2 and the reflective region 102-4 of the intelligent reflecting surface 100-4 satisfies oW1+(o+1) W2 (o is an integer of 0 or more) when the width of the reflective element 10 is W1 and the interval of the reflective element 10 is W2. In this case, the distance between the reflective region 102-2 and the reflective region 102-4 indicates the sum of the distance between the third side C2 and the reflective region 102-2 in the first direction (X-axis direction), the distance between the third side C2 and the fourth side D4 in the first direction (X-axis direction), and the distance between the fourth side D4 and the reflective region 102-4 in the first direction (X-axis direction).

In FIG. 3A, a configuration in which the four intelligent reflecting surfaces 100 are combined is shown. However, the present invention is not limited to this, and the above-described configuration in which the four intelligent reflecting surfaces 100 are combined may be further combined in the vertical and horizontal directions as one unit.

In the intelligent reflecting device according to the present embodiment, the pitch of the reflective element can be made constant in a plane in which a plurality of intelligent reflecting surfaces is combined. With the above-described configuration, the intelligent reflecting device according to the present embodiment can easily adjust the position at the time of installation, and can simplify the direction control of the radio wave.

Third Embodiment

[Configuration of Intelligent Reflecting Surface]

A configuration of the intelligent reflecting surface according to the present embodiment is the same as that of the intelligent reflecting surface according to the first embodiment except for the widths a, b, c, and d of the peripheral region. Descriptions that are the same as those of the first embodiment are omitted, and portions different from those of the intelligent reflecting surface according to the first embodiment will be described.

In the present embodiment, twice the distance a from the first side A to a reflective element 10 adjacent to the first side A among the plurality of reflective elements 10 is the sum of the integral multiple of the period (pitch) P in which the plurality of reflective elements 10 is arranged and the interval w2 of the adjacent reflective elements 10. In other words, twice the width a of the peripheral region arranged on the first side A satisfies qW1+(q+1) W2 (q is an integer of 0 or more) when the width of the reflective element 10 is W1 and the interval of the reflective element 10 is W2. In this case, the width a of the peripheral region indicates the distance between the first side A and the reflective region 102 in the second direction (Y-axis direction).

In the present embodiment, twice the distance b from the second side B to a reflective element 10 adjacent to the second side B among the plurality of reflective elements 10 is the sum of the integral multiple of the period (pitch) P in which the plurality of reflective elements 10 is arranged and the interval w2 of the adjacent reflective elements 10. In other words, twice the width b of the peripheral region arranged on the second side B satisfies pW1+(p+1) W2 (p is an integer of 0 or more) when the width of the reflective element 10 is W1 and the interval of the reflective element 10 is W2. In this case, the width b of the peripheral region indicates the distance between the second side B and the reflective region 102 in the second direction (Y-axis direction).

In the present embodiment, the sum of the distance c from the third side C to a reflective element 10 adjacent to the third side C among the plurality of reflective elements 10 and the distance d from the fourth side D to a reflective element 10 adjacent to the fourth side D among the plurality of reflective elements 10 is the sum of the integral multiple of the period (pitch) P in which the plurality of reflective elements 10 is arranged and the interval w2 of the adjacent reflective elements 10. In other words, the sum of the width c of the peripheral region arranged on the third side C and the width d of the peripheral region arranged on the fourth side D satisfies oW1+(o+1) W2 (o is an integer of 0 or more) when the width of the reflective element 10 is W1 and the interval of the reflective element 10 is W2. In this case, the width c of the peripheral region indicates the distance between the third side C and the reflective region 102 in the first direction (X-axis direction), and the width d of the peripheral region indicates the distance between the fourth side D and the reflective region 102 in the first direction (X-axis direction).

Since the intelligent reflecting surface according to the present embodiment has the above-described configuration, the pitch of the reflective elements can be made constant in a plane when a plurality of intelligent reflecting surfaces is combined.

[Configuration of Intelligent Reflecting Device]

A configuration of an intelligent reflecting device 3000 according to the present embodiment is the same as that of the intelligent reflecting device 1000 according to the first embodiment except for the arrangement direction of each intelligent reflecting surface and the distance between each reflective region. Descriptions that are the same as those of the first embodiment are omitted, and portions different from those of the intelligent reflecting device 1000 according to the first embodiment will be described.

Figure 4A:
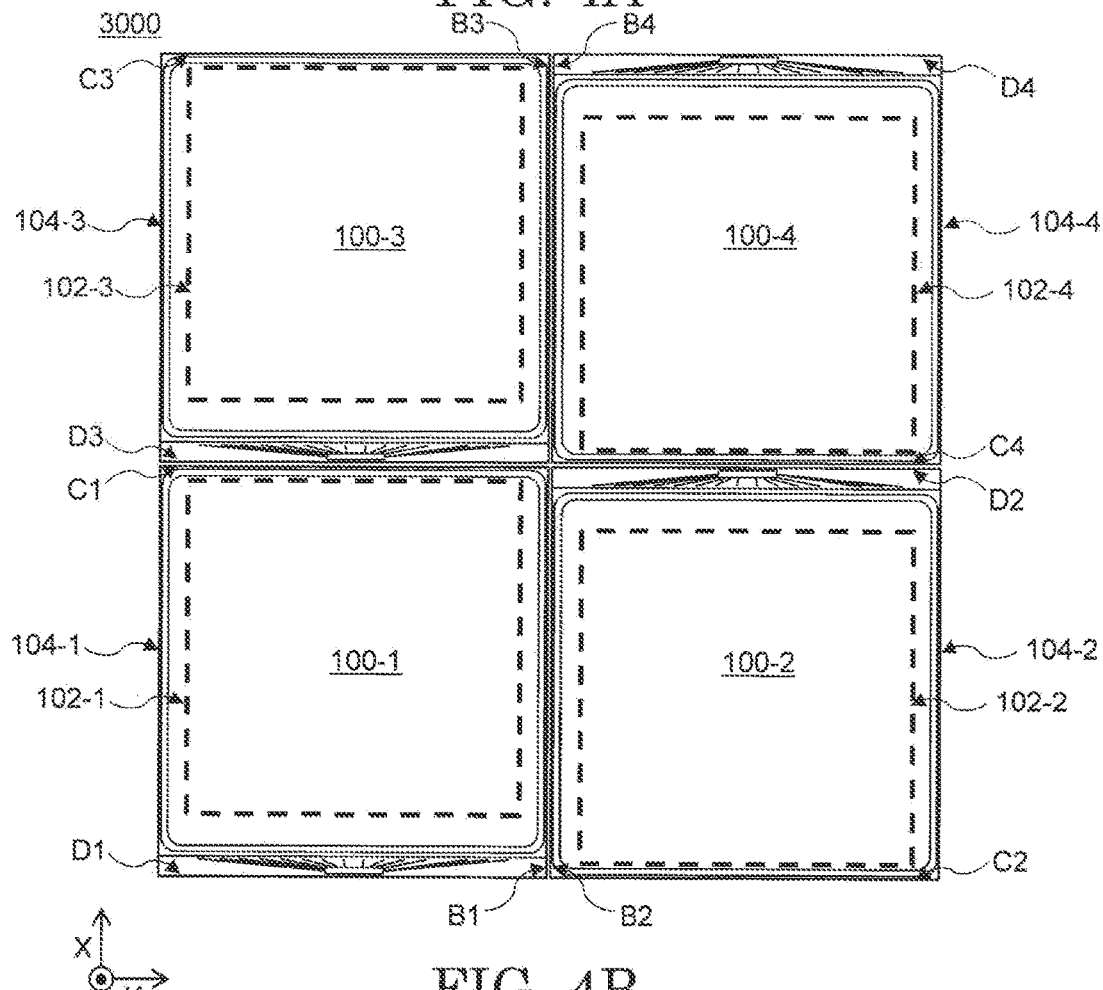
FIG. 4A is a plan view showing a configuration of an intelligent reflecting device according to an embodiment of the present invention.
Figure 4B:
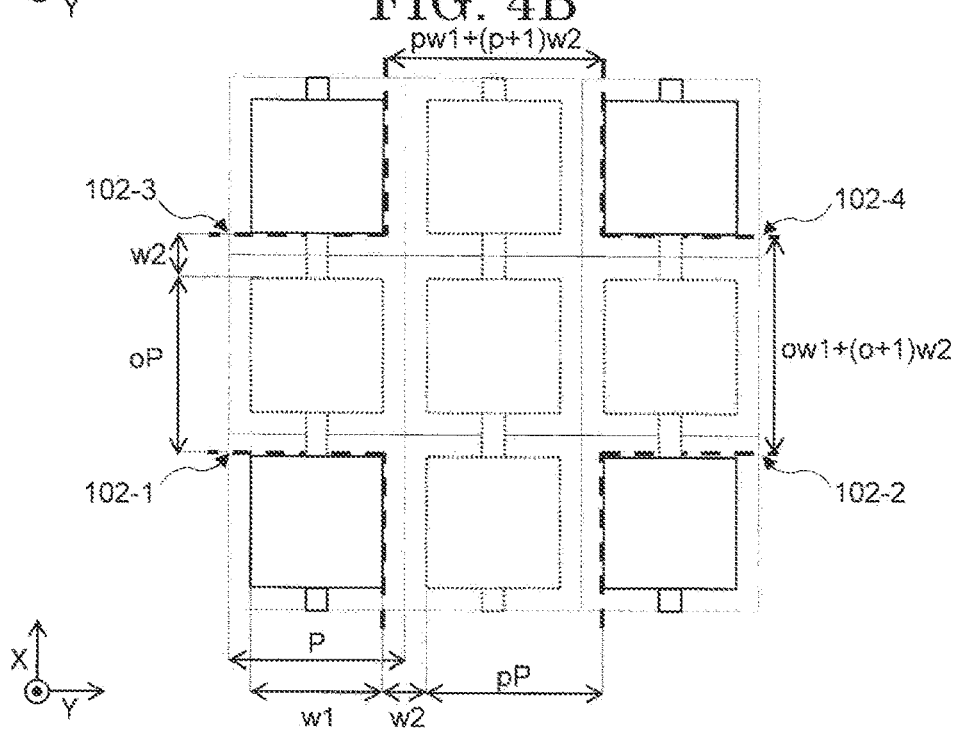
FIG. 4B is an enlarged plan view showing a connection part of each intelligent reflecting surface of an intelligent reflecting device according to an embodiment of the present invention.

FIG. 4A is a plan view showing an intelligent reflecting device according to an embodiment of the present invention. FIG. 4B is an enlarged plan view showing a connection part of an intelligent reflecting surface of an intelligent reflecting device according to an embodiment of the present invention. In FIG. 4B, the reflective elements 10 shown in dotted lines are not actually arranged, but are shown here as virtual reflective elements in order to make it easier to understand the combined pitch.

In the present embodiment, the second side B1 of the intelligent reflecting surface 100-1 and the second side B2 of the intelligent reflecting surface 100-2 are arranged adjacently. The distance between the reflective element 10 arranged adjacent to the second side B1 of the intelligent reflecting surface 100-1 and the reflective element 10 arranged adjacent to the second side B2 of the intelligent reflecting surface 100-2 is the sum of the integral multiple of the period (pitch) P in which the plurality of reflective elements 10 is arranged and the interval w2 of the adjacent reflective elements 10. In other words, the distance between the reflective region 102-1 of the intelligent reflecting surface 100-1 and the reflective region 102-2 of the intelligent reflecting surface 100-2 satisfies pW1+(p+1) W2 (p is an integer of 0 or more) when the width of the reflective element 10 is W1 and the interval of the reflective element 10 is W2. In this case, the distance between the reflective region 102-1 and the reflective region 102-2 indicates the sum of the distance between the second side B1 and the reflective region 102-1 in the second direction (Y-axis direction), the distance between the second side B1 and the second side B2 in the second direction (Y-axis direction), and the distance between the second side B2 and the reflective region 102-2 in the second direction (Y-axis direction).

In the present embodiment, the third side C1 of the intelligent reflecting surface 100-1 and the fourth side D3 of the intelligent reflecting surface 100-3 are arranged adjacently. The distance in the first direction (X-axis direction) between the reflective element 10 arranged adjacent to the third side C1 of the intelligent reflecting surface 100-1 and the reflective element 10 arranged adjacent to the fourth side D3 of the intelligent reflecting surface 100-3 is the sum of the integral multiple of the period (pitch) P in which the plurality of reflective elements 10 is arranged and the interval w2 of the adjacent reflective elements 10. In other words, the distance between the reflective region 102-1 of the intelligent reflecting surface 100-1 and the reflective region 102-3 of the intelligent reflecting surface 100-3 satisfies oW1+(o+1) W2 (o is an integer of 0 or more) when the width of the reflective element 10 is W1 and the interval of the reflective element 10 is W2. In this case, the distance between the reflective region 102-1 and the reflective region 102-3 indicates the sum of the distance between the third side C1 and the reflective region 102-1 in the first direction (X-axis direction), the distance between the third side C1 and the fourth side D3 in the first direction (X-axis direction), and the distance between the fourth side D3 and the reflective region 102-3 in the first direction (X-axis direction).

In the present embodiment, the second side B3 of the intelligent reflecting surface 100-3 and the second side B4 of the intelligent reflecting surface 100-4 are arranged adjacently. The distance in the second direction (Y-axis direction) between the reflective element 10 arranged adjacent to the second side B3 of the intelligent reflecting surface 100-3 and the reflective element 10 arranged adjacent to the second side B4 of the intelligent reflecting surface 100-4 is the sum of the integral multiple of the period (pitch) P in which the plurality of reflective elements 10 is arranged and the interval w2 of the adjacent reflective elements 10. In other words, the distance between the reflective region 102-3 of the intelligent reflecting surface 100-3 and the reflective region 102-4 of the intelligent reflecting surface 100-4 satisfies pW1+(p+1) W2 (p is an integer equal to or greater than 0) when the width of the reflective element 10 is W1 and the interval of the reflective element 10 is W2. In this case, the distance between the reflective region 102-3 and the reflective region 102-4 indicates the sum of the distance between the second side B3 and the reflective region 102-3 in the second direction (Y-axis direction), the distance between the second side B3 and the second side B4 in the second direction (Y-axis direction), and the distance between the second side B4 and the reflective region 102-4 in the second direction (Y-axis direction).

In the present embodiment, the fourth side D2 of the intelligent reflecting surface 100-2 and the third side C4 of the intelligent reflecting surface 100-4 are arranged adjacently. The distance in the first direction (X-axis direction) between the reflective element 10 arranged adjacent to the fourth side D2 of the intelligent reflecting surface 100-2 and the reflective element 10 disposed adjacent to the third side C4 of the intelligent reflecting surface 100-4 is the sum of the integral multiple of the period (pitch) P in which the plurality of reflective elements 10 is arranged and the interval w2 of the adjacent reflective elements 10. In other words, the distance between the reflective region 102-2 of the intelligent reflecting surface 100-2 and the reflective region 102-4 of the intelligent reflecting surface 100-4 satisfies oW1+(o+1) W2 (o is an integer of 0 or more) when the width of the reflective element 10 is W1 and the interval of the reflective element 10 is W2. In this case, the distance between the reflective region 102-2 and the reflective region 102-4 indicates the sum of the distance between the fourth side D2 and the reflective region 102-2 in the first direction (X-axis direction), the distance between the fourth side D2 and the third side C4 in the first direction (X-axis direction), and the distance between the third side C4 and the reflective region 102-4 in the first direction (X-axis direction).

In FIG. 4A, a configuration in which the four intelligent reflecting surfaces 100 are combined is shown. However, the present invention is not limited to this, the above-described configuration in which the four intelligent reflecting surfaces 100 are combined may be further combined in the vertical and horizontal directions as one unit.

In this case, the first side A1 of the intelligent reflecting surface 100-1 and the first side A2 of the intelligent reflecting surface 100-2 may be arranged adjacently. The distance in the second direction (Y-axis direction) between the reflective element 10 arranged adjacent to the first side A1 of the intelligent reflecting surface 100-1 and the reflective element 10 arranged adjacent to the first side A2 of the intelligent reflecting surface 100-2 is the sum of the integral multiple of the period (pitch) P in which the plurality of reflective elements 10 is arranged and the interval w2 of the adjacent reflective elements 10. In other words, the distance between the reflective region 102-1 of the intelligent reflecting surface 100-1 and the reflective region 102-2 of the intelligent reflecting surface 100-2 satisfies qW1+(q+1) W2 (q is an integer of 0 or more) when the width of the reflective element 10 is W1 and the interval of the reflective element 10 is W2. In this case, the distance between the reflective region 102-1 and the reflective region 102-2 indicates the sum of the distance between the first side A1 and the reflective region 102-1 in the second direction (Y-axis direction), the distance between the first side A1 and the first side A2 in the second direction (Y-axis direction), and the distance between the first side A2 and the reflective region 102-2 in the second direction (Y-axis direction).

Further, the first side A3 of the intelligent reflecting surface 100-3 and the first side A4 of the intelligent reflecting surface 100-4 may be arranged adjacently, and may have the same relationship as the first side A1 of the intelligent reflecting surface 100-1 and the first side A2 of the intelligent reflecting surface 100-2.

In the intelligent reflecting device according to the present embodiment, the pitch of the reflective element can be made constant in a plane in which a plurality of intelligent reflecting surfaces is combined. With the above-described configuration, the intelligent reflecting device according to the present embodiment can easily adjust the position at the time of installation, and can simplify the direction control of the radio wave.

Fourth Embodiment

[Configuration of Intelligent Reflecting Surface]

A configuration of the intelligent reflecting surface according to the present embodiment is the same as that of the intelligent reflecting surface according to the first embodiment except for the widths a and b of the peripheral region. Descriptions that are the same as those of the first embodiment are omitted, and portions different from those of the intelligent reflecting surface according to the first embodiment will be described.

In the present embodiment, twice the distance a from the first side A to a reflective element 10 adjacent to the first side A among the plurality of reflective elements 10 is the sum of the integral multiple of the period (pitch) P in which the plurality of reflective elements 10 is arranged and the interval w2 of the adjacent reflective elements 10. In other words, twice the width a of the peripheral region arranged on the first side A satisfies qW1+(q+1) W2 (q is an integer of 0 or more) when the width of the reflective element 10 is W1 and the interval of the reflective element 10 is W2. In this case, the width a of the peripheral region indicates the distance between the first side A and the reflective region 102 in the second direction (Y-axis direction).

In the present embodiment, twice the distance b from the second side B to a reflective element 10 adjacent to the second side B among the plurality of reflective elements 10 is the sum of the integral multiple of the period (pitch) P in which the plurality of reflective elements 10 is arranged and the interval w2 of the adjacent reflective elements 10. In other words, twice the width b of the peripheral region arranged on the second side B satisfies pW1+(p+1) W2 (p is an integer of 0 or more) when the width of the reflective element 10 is W1 and the interval of the reflective element 10 is W2. In this case, the width b of the peripheral region indicates the distance between the second side B and the reflective region 102 in the second direction (Y-axis direction).

In the present embodiment, twice the distance c from the third side C to a reflective element 10 adjacent to the third side C among the plurality of reflective elements 10 is the sum of the integral multiple of the period (pitch) P in which the plurality of reflective elements 10 is arranged and the interval w2 of the adjacent reflective elements 10. In other words, twice the width c of the peripheral region arranged on the third side C satisfies mW1+(m+1) W2 (m is an integer of 0 or more) when the width of the reflective element 10 is W1 and the interval of the reflective element 10 is W2. In this case, the width c of the peripheral region indicates the distance between the third side C and the reflective region 102 in the first direction (X-axis direction).

In the present embodiment, twice the distance d from the fourth side D to a reflective element 10 adjacent to the fourth side D among the plurality of reflective elements 10 is the sum of the integral multiple of the period (pitch) P in which the plurality of reflective elements 10 is arranged and the interval w2 of the adjacent reflective elements 10. In other words, twice the width d of the peripheral region arranged on the fourth side D satisfies lW1+(l+1) W2 (l is an integer of 0 or more) when the width of the reflective element 10 is W1 and the interval of the reflective element 10 is W2. In this case, the width d of the peripheral region indicates the distance between the fourth side D and the reflective region 102 in the first direction (X-axis direction).

Since the intelligent reflecting surface according to the present embodiment has the above-described configuration, the pitch of the reflective elements can be made constant in a plane when a plurality of intelligent reflecting surfaces is combined.

[Configuration of Intelligent Reflecting Device]

A configuration of an intelligent reflecting device 4000 according to the present embodiment is the same as that of the intelligent reflecting device 1000 according to the first embodiment except for the arrangement direction of each reflecting surface and the distance between each reflective region. Descriptions that are the same as those of the first embodiment are omitted, and portions different from those of the intelligent reflecting device 1000 according to the first embodiment will be described.

Figure 5A:
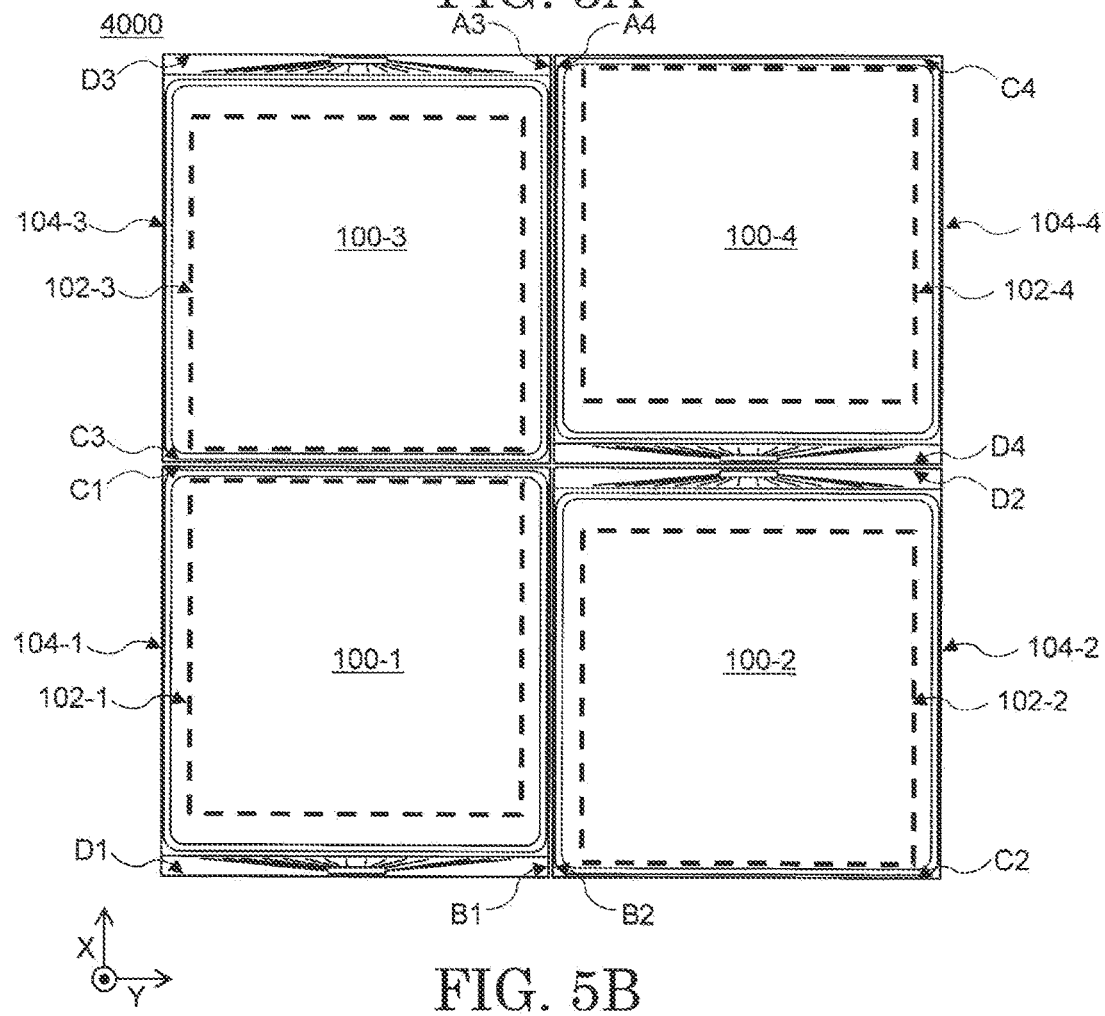
FIG. 5A is a plan view showing a configuration of an intelligent reflecting device according to an embodiment of the present invention.
Figure 5B:
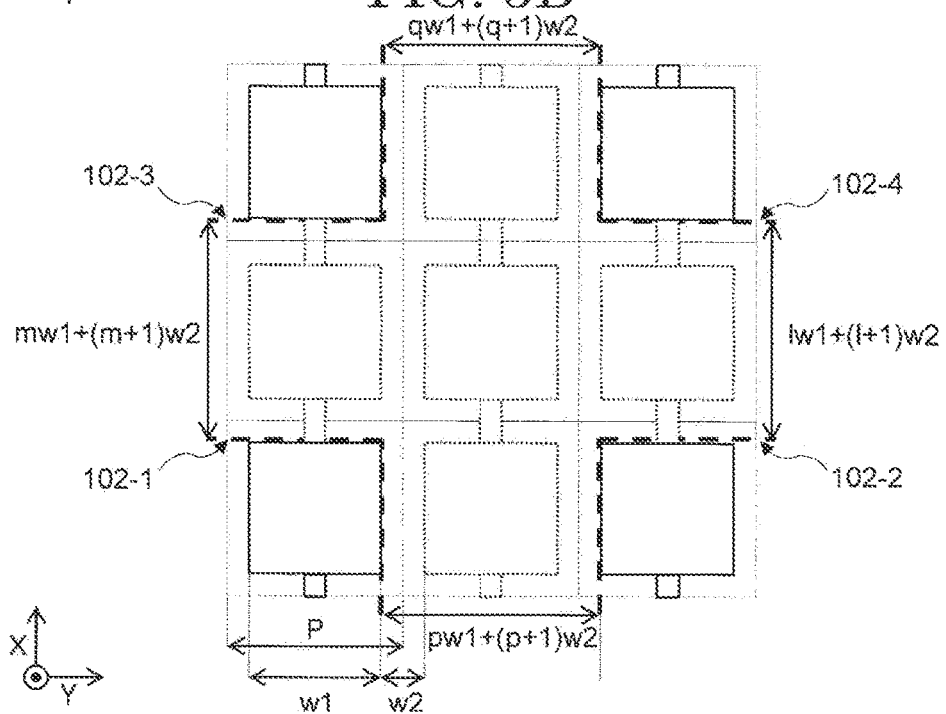
FIG. 5B is an enlarged plan view showing a connection part of each intelligent reflecting surface of an intelligent reflecting device according to an embodiment of the present invention.

FIG. 5A is a plan view showing an intelligent reflecting device according to an embodiment of the present invention. FIG. 5B is an enlarged plan view showing a connection part of an intelligent reflecting surface of an intelligent reflecting device according to an embodiment of the present invention. In FIG. 5B, the reflective elements 10 shown in dotted lines are not actually arranged, but are shown here as virtual reflective elements in order to make it easier to understand the combined pitch.

In the present embodiment, the second side B1 of the intelligent reflecting surface 100-1 and the second side B2 of the intelligent reflecting surface 100-2 are arranged adjacently. The distance in the second direction (Y-axis direction) between the reflective element 10 arranged adjacent to the second side B1 of the intelligent reflecting surface 100-1 and the reflective element 10 arranged adjacent to the second side B2 of the intelligent reflecting surface 100-2 is the sum of the integral multiple of the period (pitch) P in which the plurality of reflective elements 10 is arranged and the interval w2 of the adjacent reflective elements 10. In other words, the distance between the reflective region 102-1 of the intelligent reflecting surface 100-1 and the reflective region 102-2 of the intelligent reflecting surface 100-2 satisfies pW1+(p+1) W2 (p is an integer of 0 or more) when the width of the reflective element 10 is W1 and the interval of the reflective element 10 is W2. In this case, the distance between the reflective region 102-1 and the reflective region 102-2 indicates the sum of the distance between the second side B1 and the reflective region 102-1 in the second direction (Y-axis direction), the distance between the second side B1 and the second side B2 in the second direction (Y-axis direction), and the distance between the second side B2 and the reflective region 102-2 in the second direction (Y-axis direction).

In the present embodiment, the third side C1 of the intelligent reflecting surface 100-1 and the third side C3 of the intelligent reflecting surface 100-3 are arranged adjacently. The distance in the first direction (X-axis direction) between the reflective element 10 arranged adjacent to the third side C1 of the intelligent reflecting surface 100-1 and the reflective element 10 arranged adjacent to the third side C3 of the intelligent reflecting surface 100-3 is the sum of the integral multiple of the period (pitch) P in which the plurality of reflective elements 10 is arranged and the interval w2 of the adjacent reflective elements 10. In other words, the distance between the reflective region 102-1 of the intelligent reflecting surface 100-1 and the reflective region 102-3 of the intelligent reflecting surface 100-3 satisfies mW1+(m+1) W2 (m is an integer of 0 or more) when the width of the reflective element 10 is W1 and the interval of the reflective element 10 is W2. In this case, the distance between the reflective region 102-1 and the reflective region 102-3 indicates the sum of the distance between the third side C1 and the reflective region 102-1 in the first direction (X-axis direction), the distance between the third side C1 and the third side C3 in the first direction (X-axis direction), and the distance between the third side C3 and the reflective region 102-3 in the first direction (X-axis direction).

In the present embodiment, the first side A3 of the intelligent reflecting surface 100-3 and the first side A4 of the intelligent reflecting surface 100-4 are arranged adjacently. The distance in the second direction (Y-axis direction) between the reflective element 10 arranged adjacent to the first side A3 of the intelligent reflecting surface 100-3 and the reflective element 10 arranged adjacent to the first side A4 of the intelligent reflecting surface 100-4 is the sum of the integral multiple of the period (pitch) P in which the plurality of reflective elements 10 is arranged and the interval w2 of the adjacent reflective elements 10. In other words, the distance between the reflective region 102-3 of the intelligent reflecting surface 100-3 and the reflective region 102-4 of the intelligent reflecting surface 100-4 satisfies qW1+(q+1) W2 (q is an integer of 0 or more) when the width of the reflective element 10 is W1 and the interval of the reflective element 10 is W2. In this case, the distance between the reflective region 102-3 and the reflective region 102-4 indicates the sum of the distance between the first side A3 and the reflective region 102-3 in the second direction (Y-axis direction), the distance between the first side A3 and the first side A4 in the second direction (Y-axis direction), and the distance between the first side A4 and the reflective region 102-4 in the second direction (Y-axis direction).

In the present embodiment, the fourth side D2 of the intelligent reflecting surface 100-2 and the fourth side D4 of the intelligent reflecting surface 100-4 are arranged adjacently. The distance in the first direction (X-axis direction) between the reflective element 10 arranged adjacent to the fourth side D2 of the intelligent reflecting surface 100-2 and the reflective element 10 arranged adjacent to the fourth side D4 of the intelligent reflecting surface 100-4 is the sum of the integral multiple of the period (pitch) P in which the plurality of reflective elements 10 is arranged and the interval w2 of the adjacent reflective elements 10. In other words, the distance between the reflective region 102-2 of the intelligent reflecting surface 100-2 and the reflective region 102-4 of the intelligent reflecting surface 100-4 satisfies lW1+(l+1) W2 (l is an integer of 0 or more) when the width of the reflective element 10 is W1 and the interval of the reflective element 10 is W2. In this case, the distance between the reflective region 102-2 and the reflective region 102-4 indicates the sum of the distance between the fourth side D2 and the reflective region 102-2 in the first direction (X-axis direction), the distance between the fourth side D2 and the fourth side D4 in the first direction (X-axis direction), and the distance between the fourth side D4 and the reflective region 102-4 in the first direction (X-axis direction).

In FIG. 5A, a configuration in which the four intelligent reflecting surfaces 100 are combined is shown. However, the present invention is not limited to this, the above-described configuration in which the four intelligent reflecting surfaces 100 are combined may be further combined in the vertical and horizontal directions as one unit.

In the intelligent reflecting device according to the present embodiment, the pitch of the reflective element can be made constant in a plane in which a plurality of intelligent reflecting surfaces is combined. With the above-described configuration, the intelligent reflecting device according to the present embodiment can easily adjust the position at the time of installation, and can simplify the direction control of the radio wave.

Modified Example

[Configuration of Intelligent Reflecting Surface]

A configuration of the intelligent reflecting surface according to the present modified example is the same as that of the intelligent reflecting surface according to the first embodiment except that the first electrode 150 is electrically connected to a drive circuit 280 by a thin line pattern 260. Descriptions that are the same as those of the first embodiment are omitted, and portions different from those of the intelligent reflecting surface according to the first embodiment will be described.

Figure 6:
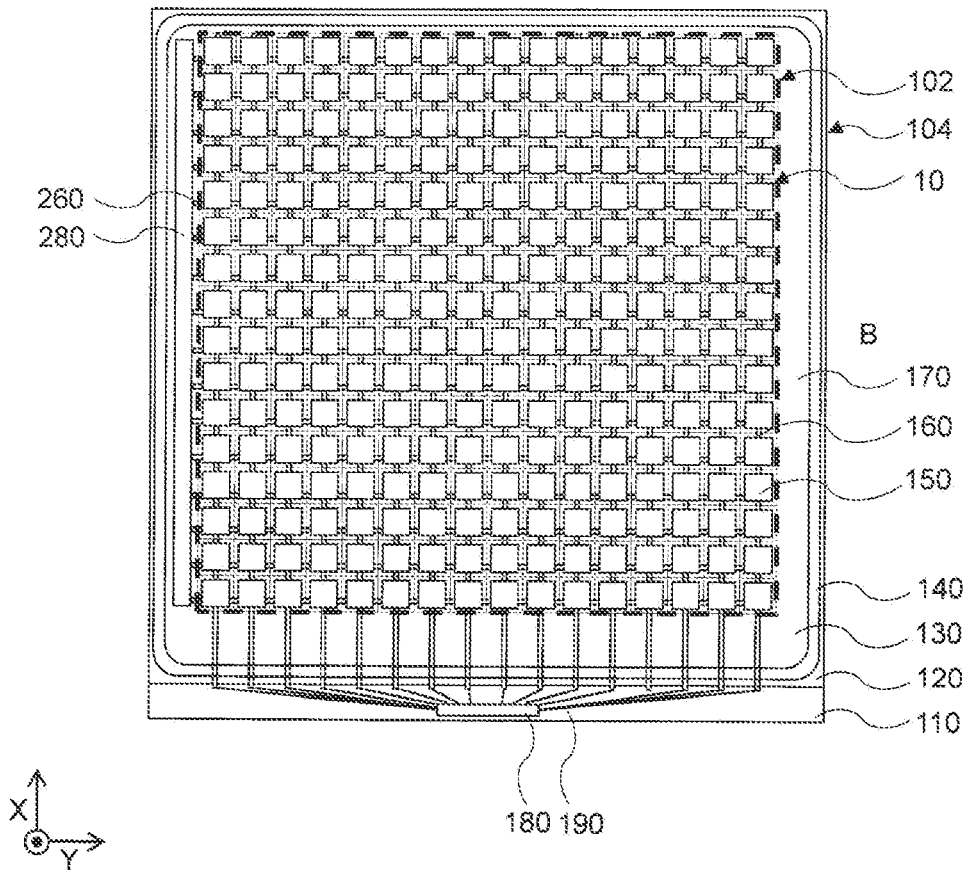
FIG. 6 is a plan view showing a configuration of an intelligent reflecting surface according to an embodiment of the present invention.

FIG. 6 is a plan view showing an intelligent reflecting surface according to a modified example of the present invention. In the intelligent reflecting surface 200, the reflective region 102 that reflects a radio wave and the peripheral region 104 that surrounds the reflective region 102 are arranged on the first surface of the array substrate 110. In the reflective region 102, the plurality of reflective elements 10 is spaced apart at the same interval w2 as the adjacent reflective elements 10, and is arranged in an array at the same period (pitch) P in the first direction (direction X) along the first side A of the array substrate 110 and in the second direction (direction Y) perpendicular to the first direction.

In the reflective region 102, the plurality of first electrodes 150 arranged along the first direction (X-axis direction) is electrically connected by the thin line pattern 160. In the peripheral region 104, the thin line pattern 160 is electrically connected to the drive circuit 180 via the wiring 190. The counter substrate 120 exposes the wiring 190 and the drive circuit 180 on the array substrate 110. A flexible printed substrate is further connected to the drive circuit 180 via a terminal (not shown).

In the reflective region 102, the plurality of first electrodes 150 arranged along the second direction (Y-axis direction) is electrically connected by the thin line pattern 260. In the peripheral region 104, the thin line pattern 260 is electrically connected to the drive circuit 280.

Figure 7:
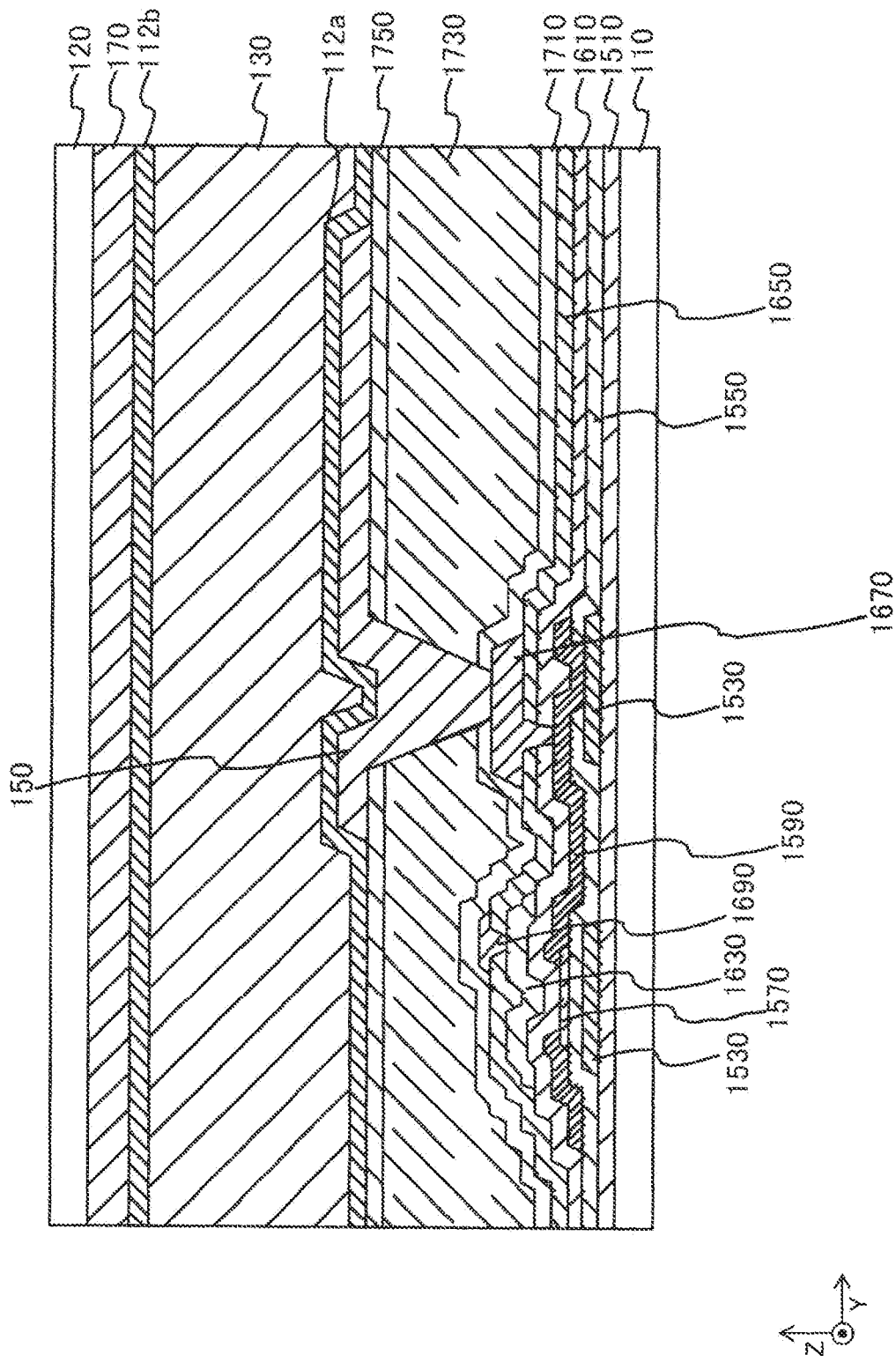
FIG. 7 is a cross-sectional end view showing an example of a thin film transistor of an intelligent reflecting surface according to a modified example of the present invention.

In the intelligent reflecting surface 200, each first electrode 150 is connected to the thin line pattern 160 and the thin line pattern 260 via a thin film transistor (TFT) shown in FIG. 7. FIG. 7 is a cross-sectional view showing an example of the TFT. For example, the TFT has a structure in which an undercoat layer 1510, a gate electrode 1530, a bottom-gate insulating film 1550, a n oxide semiconductor layer 1570, a first connection wiring layer 1590, a top-gate insulating film 1610, a bottom-gate electrode 1630, a passivation film 1650, a second connection wiring layer 1670, a signal line 1690, and an insulating film 1710 are sequentially stacked on the array substrate 110. In the TFT, an overcoat layer 1730, an insulating film 1750, the first electrode 150, a first alignment film 112a, the liquid crystal layer 130, a second alignment film 112b, the second electrode 170, and the counter substrate 120 are sequentially stacked.

For example, the undercoat layer 1510 may be composed of a silicon oxide film. For example, the bottom-gate insulating film 1550 may be composed of a stacked structure of SiN/SiO. For example, the gate electrode 1530 may be composed of molybdenum, tungsten, or an alloy thereof. For example, the top-gate insulating film 1610 may be composed of a silicon oxide film. For example, the first connection wiring layer 1590 and the second connection wiring layer 1670 may be composed of a stacked structure of Ti/Al/Ti or a stacked structure of Mo/Al/Mo. For example, the passivation film 1650 may be composed of a silicon nitride film. For example, the insulating film 1710 may be composed of a silicon oxide film or a silicon nitride film. For example, the first electrode 150 may be composed of a stacked structure of Ti/Al/Ti, or a stacked structure of Mo/Al/Mo. For example, the second electrode 170 may be composed of molybdenum, tungsten, or an alloy thereof.

In FIG. 7, the TFT is shown as a dual-gate TFT using the oxide semiconductor, but amorphous silicon may be used or low-temperature polysilicon (LTPS) may be used. In FIG. 7, an example of vertical electric field driving is shown, but horizontal electric field driving may be used.

The intelligent reflecting surface 200 has a reflection axis parallel to the first direction (X-axis direction) and a reflection axis parallel to the second direction (Y-axis direction). In the intelligent reflecting surface 200, the first electrode 150 is connected to the thin line pattern 160 and the thin line pattern 260 via the thin film transistor (TFT) shown in FIG. 7, and is individually controlled. For this reason, the intelligent reflecting surface 200 can control the reflection angle in the rotation direction with the reflection axis parallel to the first direction (X-axis direction) and the reflection axis parallel to the second direction (Y-axis direction) as axes. Therefore, combining these elements makes it possible to control the reflection angle in all directions in front with respect to the intelligent reflecting surface.

What is claimed is:

1. An intelligent reflecting surface comprising:
a substrate having a first surface including a first side; and
a reflective region including a plurality of reflective elements arranged on the first surface, the plurality of reflective elements separated from each other by a first interval and arranged at a first pitch in a first direction and a second direction orthogonal to the first direction, wherein
twice a distance from the first side to a first reflective element adjacent to the first side among the plurality of reflective elements is a sum of an integral multiple of the first pitch and the first interval.

2. The intelligent reflecting surface according to claim 1, wherein
the first surface further includes a second side opposed to the first side, and
twice a distance from the second side to a second reflective element adjacent to the second side among the plurality of reflective elements is the sum of the integral multiple of the first pitch and the first interval.

3. The intelligent reflecting surface according to claim 1, wherein
the first surface further includes a third side connected to the first side and a fourth side opposed to the third side, and
a sum of a distance from the third side to a third reflective element adjacent to the third side among the plurality of reflective elements and a distance from the fourth side to a fourth reflective element adjacent to the fourth side among the plurality of reflective elements is the sum of the integral multiple of the first pitch and the first interval.

4. The intelligent reflecting surface according to claim 1, wherein
the sum of the integral multiple of the first pitch and the first interval is nW1+(n+1) W2 (n is an integer of 0 or more), a width of each of the plurality of reflective elements is W1 and the first interval is W2.

5. The intelligent reflecting surface according to claim 1, wherein
each of the plurality of reflective elements include a first electrode, a second electrode, and a liquid crystal layer arranged between the first electrode and the second electrode.

6. An intelligent reflecting surface comprising:
a substrate having a first surface including a first side and a second side opposed to the first side; and
a reflective region including a plurality of reflective elements arranged on the first surface, the plurality of reflective elements separated from each other by a first interval and arranged at a first pitch in a first direction and a second direction orthogonal to the first direction, wherein
a sum of a distance from the first side to a first reflective element adjacent to the first side among the plurality of reflective elements and a distance from the second side to a second reflective element adjacent to the second side among the plurality of reflective elements is a sum of an integral multiple of the first pitch and the first interval.

7. The intelligent reflecting surface according to claim 6, wherein
the first surface further includes a third side connected to the first side and the second side, and
twice a distance from the third side to a third reflective element adjacent to the third side among the plurality of reflective elements is a sum of the integral multiple of the first pitch and the first interval.

8. The intelligent reflecting surface according to claim 7, wherein
the first surface further includes a fourth side opposed to the third side, and
twice a distance from the fourth side to a fourth reflective element adjacent to the fourth side among the plurality of reflective elements is the sum of the integral multiple of the first pitch and the first interval.

9. The intelligent reflecting surface according to claim 6, wherein
the sum of the integral multiple of the first pitch and the first interval is nW1+(n+1) W2 (n is an integer of 0 or more), a width of each of the plurality of reflective elements is W1 and the first interval is W2.

10. The intelligent reflecting surface according to claim 6, wherein each of the plurality of reflective elements includes a first electrode, a second electrode, and a liquid crystal layer arranged between the first electrode and the second electrode.

11. An intelligent reflecting device comprising:
a first intelligent reflecting surface and a second intelligent reflecting surface adjacent to the first intelligent reflecting surface; wherein
each of the first intelligent reflecting surface and the second intelligent reflecting surface includes;
 a substrate having a first surface including a first side, and
 a reflective region including a plurality of reflective elements arranged on the first surface, the plurality of reflective elements separated from each other by a first interval and arranged at a first pitch in a first direction and a second direction orthogonal to the first direction, and
a distance in the second direction between a first reflective element arranged adjacent to the first side among the plurality of reflective elements of the first intelligent reflecting surface and a second reflective element arranged adjacent to the first side among the plurality of reflective elements of the second intelligent reflecting surface is a sum of an integral multiple of the first pitch and the first interval.

12. The intelligent reflecting device according to claim 11, further comprising:
a third intelligent reflecting surface including the substrate and the reflective region, wherein
the first surface includes a third side connected to the first side,
the third side of the first intelligent reflecting surface and the third side of the third intelligent reflecting surface are arranged adjacently,
a distance in the first direction between a third reflective element arranged adjacent to the third side among the plurality of reflective elements of the first intelligent reflecting surface and a fourth reflective element arranged adjacent to the third side among the plurality of reflective elements of the third intelligent reflecting surface is the sum of the integral multiple of the first pitch and the first interval.

13. The intelligent reflecting device according to claim 12, further comprising:
a fourth intelligent reflecting surface including the substrate and the reflective region, wherein
the first surface further includes a fourth side opposed to the third side;
the fourth side of the second intelligent reflecting surface and the fourth side of the fourth intelligent reflecting surface are arranged adjacently, and
a distance in the first direction between a fifth reflective element arranged adjacent to the fourth side among the plurality of reflective elements of the second intelligent reflecting surface and a sixth reflective element arranged adjacent to the fourth side among the plurality of reflective elements of the fourth intelligent reflecting surface is the sum of the integral multiple of the first pitch and the first interval.

14. The intelligent reflecting device according to claim 11, further comprising:
a third intelligent reflecting surface including the substrate and the reflective region, wherein
the first surface further includes a third side connected to the first side and a fourth side opposed to the third side,
the third side of the first intelligent reflecting surface and the fourth side of the third reflecting surface are arranged adjacently, and
a distance in the first direction between a third reflective element arranged adjacent to the third side among the plurality of reflective elements of the first intelligent reflecting surface and a fourth reflective element arranged adjacent to the fourth side among the plurality of reflective elements of the third intelligent reflecting surface is the sum of the integral multiple of the first pitch and the first interval.

15. The intelligent reflecting device according to claim 14, further comprising:
a fourth intelligent reflecting surface including the substrate and the reflective region; wherein
the third side of the second intelligent reflecting surface and the fourth side of the fourth intelligent reflecting surface are arranged adjacently,
a distance in the first direction between a fifth reflective element arranged adjacent to the third side among the plurality of reflective elements of the second intelligent reflecting surface and a sixth reflective element arranged adjacent to the fourth side among the plurality of reflective elements of the fourth intelligent reflecting surface is the sum of the integral multiple of the first pitch and the first interval.

16. The intelligent reflecting device according to claim 11, wherein
the sum of the integral multiple of the first pitch and the first interval is nW1+(n+1) W2 (n in an integer of 0 or more), a width of each of the plurality of reflective elements is W1 and the first interval is W2.

17. The intelligent reflecting device according to claim 11, wherein
each of the plurality of reflective elements includes a first electrode, a second electrode, and a liquid crystal layer arranged between the first electrode and the second electrode.

18. The intelligent reflecting device according to claim 11, wherein
each of the plurality of reflective elements includes a transistor.

19. The intelligent reflecting device according to claim 11, wherein
the width of each of the plurality of reflective elements in the first direction and the width of each of the plurality of reflective elements in the second direction is the same.

* * * * *